US012352341B2

(12) United States Patent
Bindra et al.

(10) Patent No.: US 12,352,341 B2
(45) Date of Patent: Jul. 8, 2025

(54) TWO SPEED ELECTRIC VEHICLE TRANSAXLE ARCHITECTURE WITH DUAL SIMPLE PLANETARY GEARSETS AND A LAYSHAFT GEAR

(71) Applicant: Dana Automotive Systems Group, LLC, Maumee, OH (US)

(72) Inventors: Raunak Bindra, Novi, MI (US); Thomas McGinn, Novi, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/446,769

(22) Filed: Aug. 9, 2023

(65) Prior Publication Data
US 2024/0052916 A1 Feb. 15, 2024

Related U.S. Application Data

(60) Provisional application No. 63/371,036, filed on Aug. 10, 2022.

(51) Int. Cl.
*F16H 37/08* (2006.01)
*F16H 61/28* (2006.01)
(52) U.S. Cl.
CPC ..... *F16H 37/0833* (2013.01); *F16H 61/2807* (2013.01); *F16H 2200/0034* (2013.01); *F16H 2200/2007* (2013.01); *F16H 2200/2033* (2013.01)

(58) Field of Classification Search
CPC ............ F16H 37/0833; F16H 61/2807; F16H 2200/0034; F16H 2200/2007; F16H 2200/2033; F16H 2200/0021; F16H 2200/2035; F16H 2200/2064; F16H 2200/2094; F16H 2200/2097; F16H 3/666; F16H 57/023; F16H 57/082; F16H 63/32; F16H 3/44; B60K 1/00; B60K 2001/001; B60Y 2400/73
See application file for complete search history.

(56) References Cited

U.S. PATENT DOCUMENTS

| | | | |
|---|---|---|---|
| 2006/0154777 A1* | 7/2006 | Haka | F16H 3/66 475/280 |
| 2014/0349799 A1* | 11/2014 | Kaltenbach | B60K 6/365 475/5 |
| 2017/0204942 A1* | 7/2017 | Iuchi | F16H 3/66 |
| 2020/0063856 A1* | 2/2020 | Bujold | B60K 17/344 |
| 2022/0307573 A1* | 9/2022 | Mittelberger | B60K 17/02 |
| 2023/0044179 A1* | 2/2023 | Wechs | F16H 3/663 |
| 2023/0122997 A1* | 4/2023 | Renner | F16H 3/66 475/150 |
| 2023/0228321 A1* | 7/2023 | Glückler | B60K 1/00 |

* cited by examiner

*Primary Examiner* — Farhana Pervin
(74) *Attorney, Agent, or Firm* — McCoy Russell LLP

(57) ABSTRACT

Methods and systems are provided for a transmission. In one example, a system includes a shifting mechanism arranged between a first planetary gearset and a second planetary gearset arranged in series, wherein the shifting mechanism is configured to adjust an operating mode to a first mode, a second mode, or a tow mode.

18 Claims, 9 Drawing Sheets

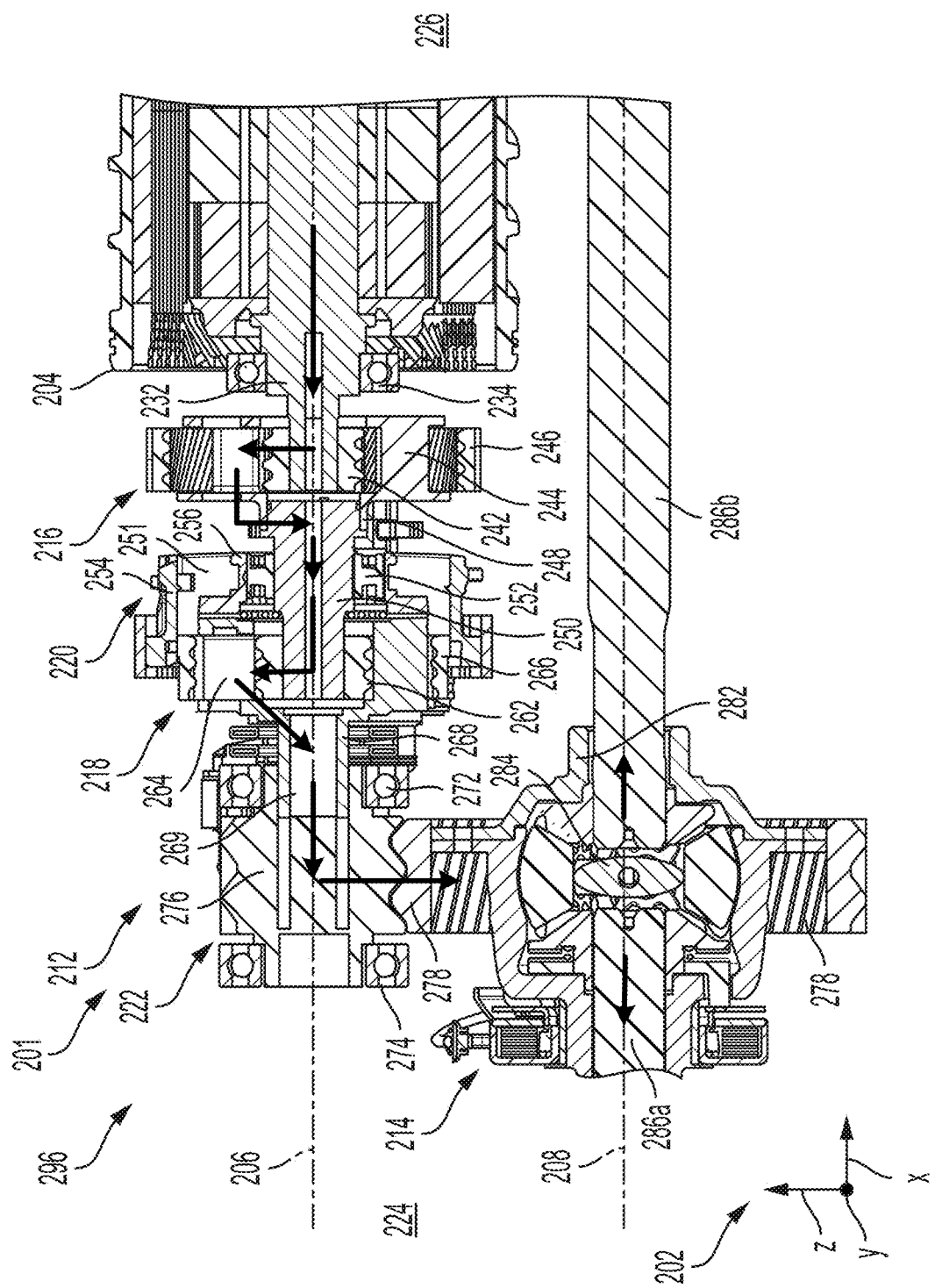

TWO SPEED ELECTRIC VEHICLE TRANSAXLE ARCHITECTURE WITH DUAL SIMPLE PLANETARY GEARSETS AND A LAYSHAFT GEAR

CROSS REFERENCE TO RELATED APPLICATION

The present application claims priority to U.S. Provisional Application No. 63/371,036, entitled "TWO SPEED ELECTRIC VEHICLE TRANSAXLE ARCHITECTURE WITH DUAL SIMPLE PLANETARY GEARSETS AND A LAYSHAFT GEAR", and filed on Aug. 10, 2022. The entire contents of the above-listed application are hereby incorporated by reference for all purposes.

TECHNICAL FIELD

The present description relates generally to systems for a multi shaft transmission with a trans axle architecture capable of providing a greater torque output in a more compact space.

BACKGROUND/SUMMARY

As vehicles continue to become increasingly electrified, power transfer and packaging layouts are updated. These updates may include changes to a vehicle architecture, adjustments to gear sizes and ratios, insertion points, and the like. In some applications, higher output demands may demand larger electric motors, which may not fit a current chassis configuration. Thus, powertrain systems that differ from those that are available may be desired.

In one example, a system includes a shifting mechanism arranged between a first planetary gearset and a second planetary gearset arranged in series, wherein the shifting mechanism is configured to adjust an operating mode to a first mode, a second mode, or a tow mode.

BRIEF DESCRIPTION OF THE FIGURES

FIG. 2C shows the components of FIG. 2A with a power flow in the low range mode.

DETAILED DESCRIPTION

Figure 1:
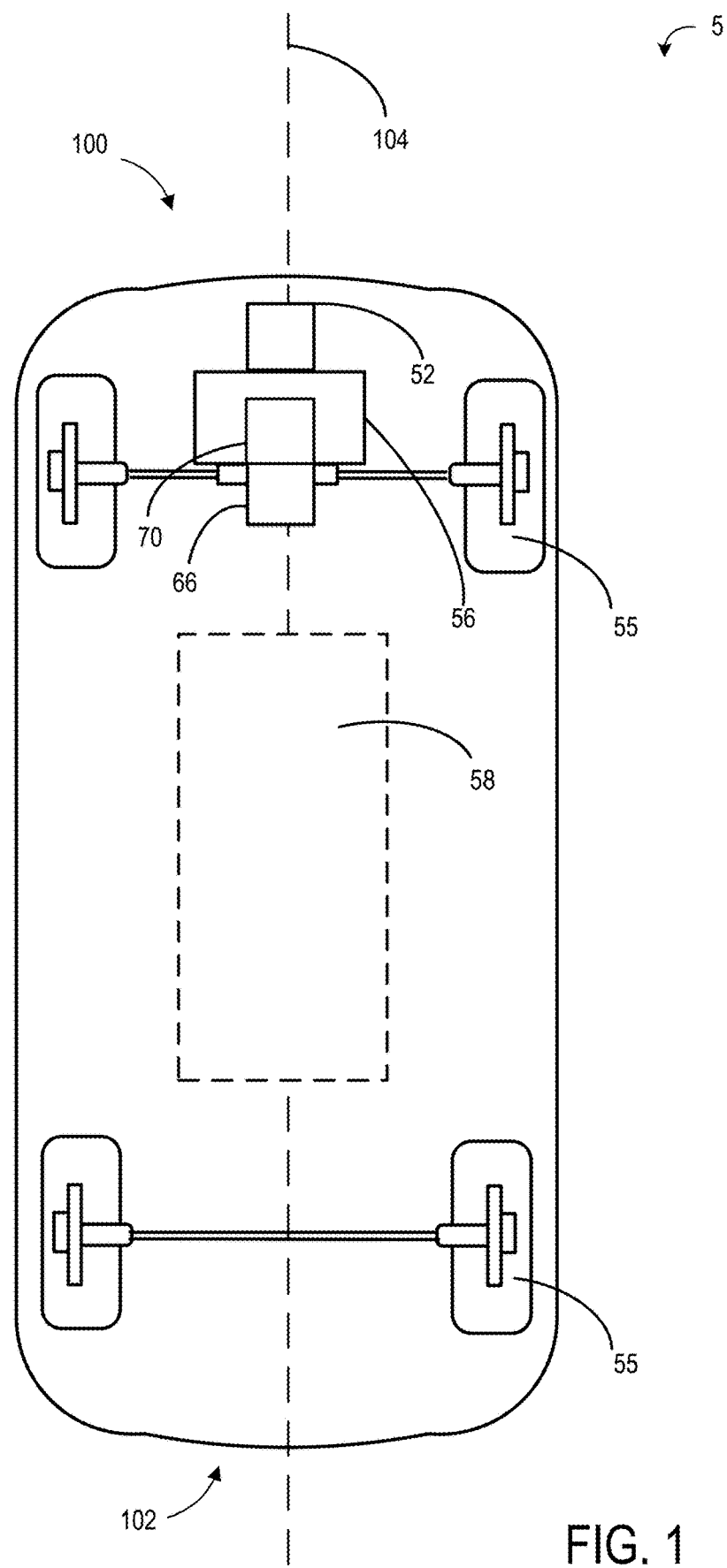
FIG. 1 shows an example schematic of a vehicle which may include a transaxle gear assembly as part of the transmission.

The systems disclosed herein may relate to compact gearbox including a plurality planetary gearsets, a shifting mechanism, and a layshaft gearpair. Components of the gearbox may circumferentially surround an axis and may mechanically couple to the shaft of an electric machine. The layshaft gearpair may mechanically couple the gearbox and motor to and drive a differential and a pair of axle shafts.

In an example, a gearbox is provided with a small packaging envelope while meeting high overall system efficiency and reduced weight. In addition, a motor may be positioned at a vertically higher axis, with respect to gravity, than a wheel or differential axis to provide increased protection from road forces. A challenge with such an approach is to integrate various systems in the desired boundary envelope e.g., gearsets, motor, inverter, differential, oil cooler (heat exchanger), oil pump etc. Furthermore, a high output torque demand may use a large electric motor and large gearsets (for high numeric ratio), which can be challenging to package in a desired packaging envelope.

In an approach, a smaller size and lower output torque motor may be used in conjunction with relatively smaller gearsets and small numeric ratios to achieve torque magnitudes greater than a desired high torque output (e.g., 7600 Nm) with less weight and increased efficiency.

In an example, a system includes multiple (e.g., exactly two) planetary gearsets in a series connection that output to a parallel axis (e.g., layshaft) gearpair, where one of the gears is connected to a differential that outputs torque to both wheels. The electric motor and the two planetary gearsets are mounted on a common axis that is different than the wheel axis. A shifting mechanism may be used that is located in between the two planetary gearsets. The shifting mechanism may include a shift actuator, shift fork, sliding collar, and dog rings (e.g., on a shift ring and the sliding collar) mounted on respective elements that are to be connected/disconnected depending upon gear state.

In an example, various physical connections may be provided, including one or more of: a motor shaft splined to a first sun gear of the first planetary gearset; a first ring gear locked to the transmission casing and is stationary; the output shaft of a first planetary carrier of the first planetary gearset splined to a second sun gear of a second planetary gearset; the second planetary carrier splined to a layshaft pinion gear for the layshaft gearpair; a motor rotor shaft splined to first planetary sun gear; a first ring gear (annulus) on the first planetary locked to the transmission casing and stationary (e.g., grounded to the transmission case and/or vehicle frame); a second planetary carrier output shaft splined to the second planetary sun gear; and/or a secondary planetary carrier splined to a layshaft pinion gear.

Transmission functions may be divided into multiple (e.g., two) speed ratios depending upon vehicle tractive effort requirements. The two speed ratios are achieved by selective use of one or more shifting mechanisms. Additionally, a neutral state is also achieved by having the shift fork in the middle of its two extreme positions wherein, torque from motor does not flow to the output. A method of operation may include operating the system in one or more of the gear ratios or modes depending on operating conditions of the vehicle and/or in response to an operator command.

Figure 2A:
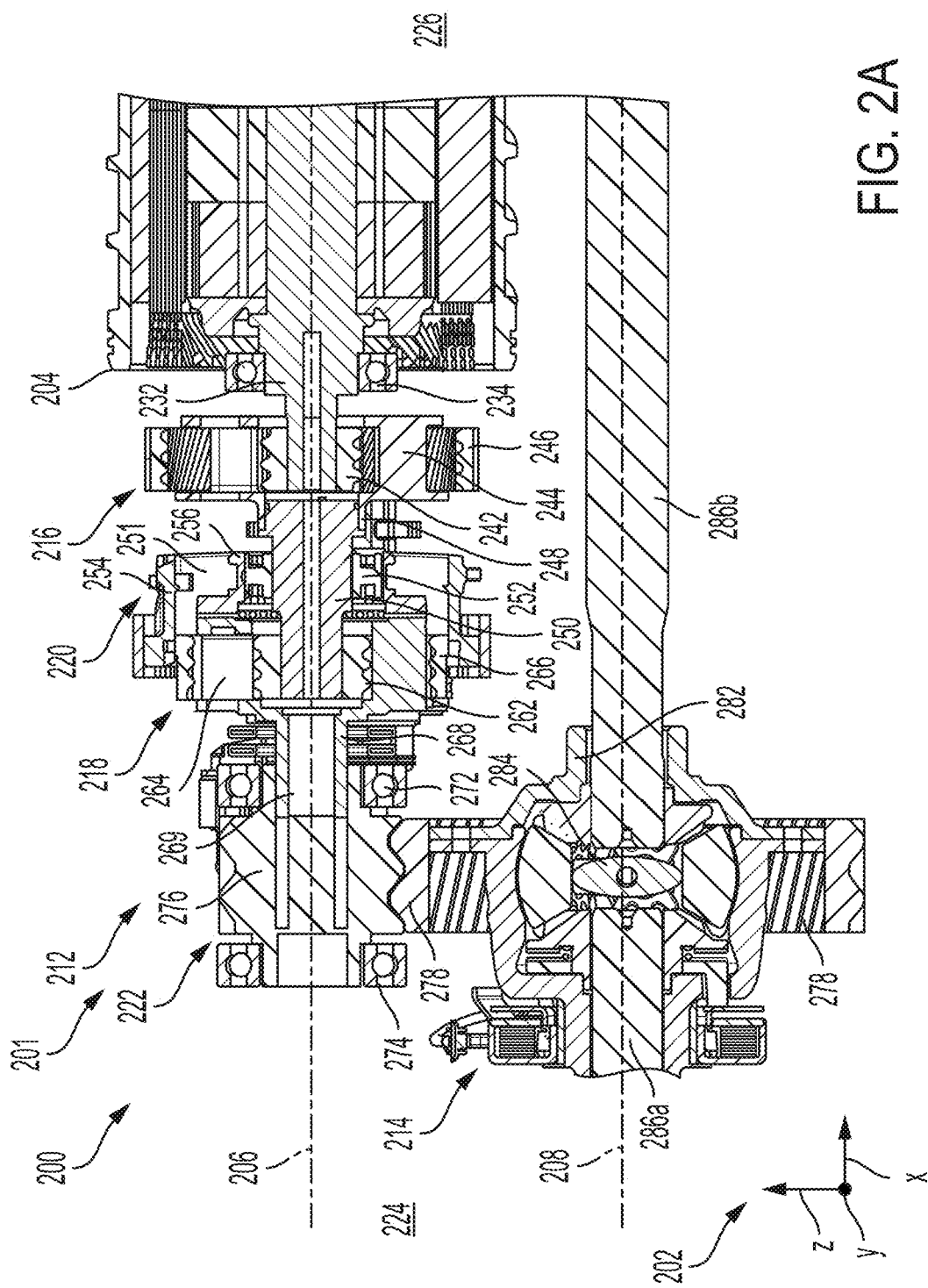
FIG. 2A shows a cross section of an example of the components of the present disclosure gear box, transaxle gear assembly, and differential.
Figure 2B:
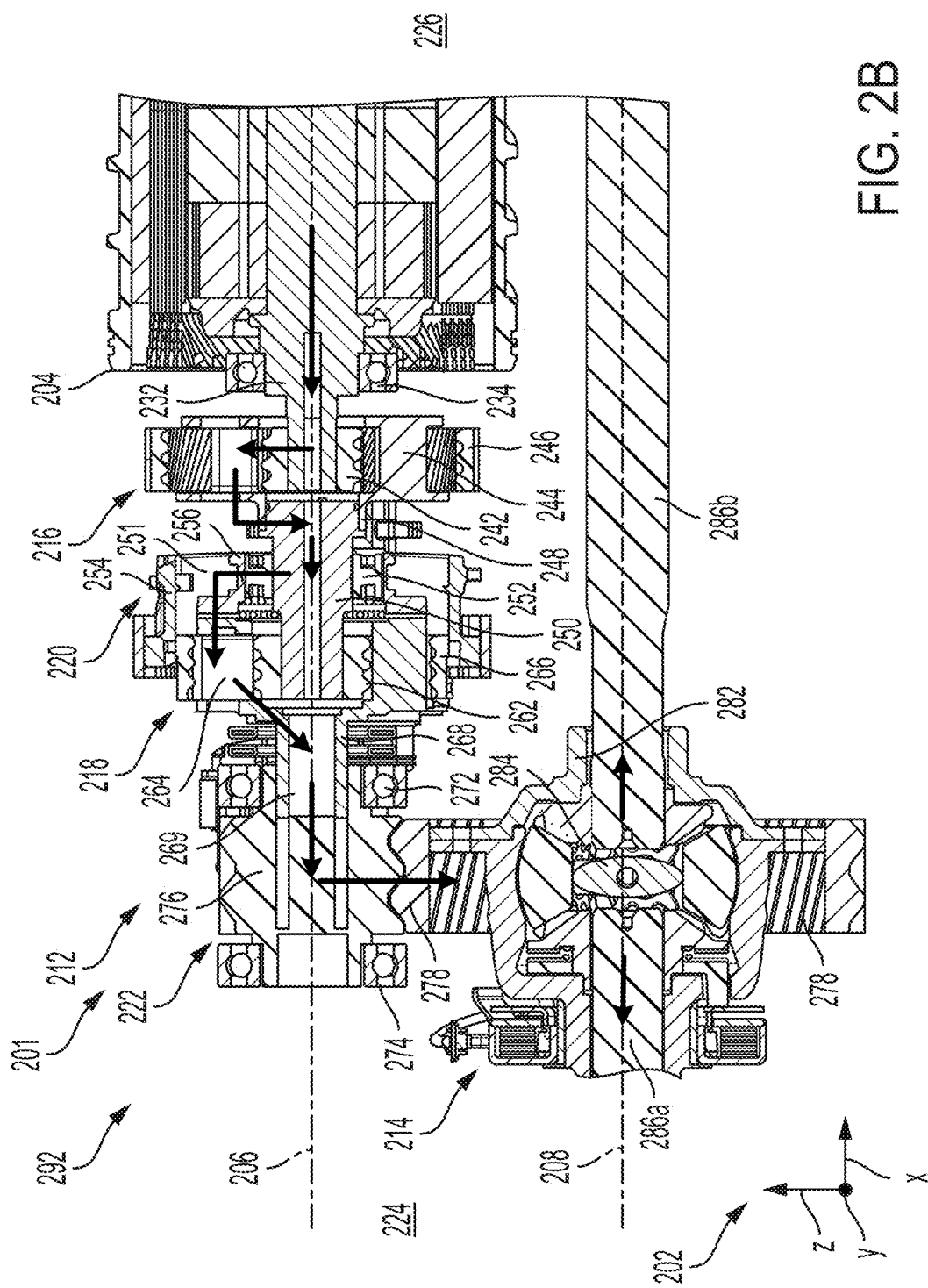
FIG. 2B shows the components of FIG. 2A with a power flow for operations in the high range mode.

A first speed ratio (high range) may be provided for normal driving range (city/highway driving) that is a lower numeric ratio. In this gear state, ratio multiplication occurs through a first planetary gearset and the layshaft gear pair. The second planetary gearset may be completely locked and rotates as one unit (flywheel) to give a 1:1 ratio. In an example, this happens as follows:

When the shift actuator is supplied electric power, the actuator moves towards a first position (see FIG. 2A-2B). A shift fork is physically connected to the actuator that moves (translates in one axis) along with it. This in turn moves the sliding collar that is attached to the shift fork. The sliding collar has dog clutch style teeth that mates with similar dog teeth on a shift ring splined on the first planetary carrier shaft. This enables direct physical connection between the first planetary carrier and the second planetary carrier. This implies that both the second planetary sun gear and the second planetary carrier are rotating with the same rotation per minute (RPM) speed (equal to the first planetary carrier) which makes the second planetary ring gear rotate with same RPM speed as well (See FIG. 2A-2B).

A second ratio (Low Range) may be provided (such as for off-roading events, such as off highway driving)—that is a higher numeric ratio. In this gear state, ratio multiplication occurs thru planetary a second gearset along with the first planetary and layshaft gear pair to achieve higher numeric ratio.

The second planetary sun gear receives input torque/speed from the first planetary carrier. The second ring gear is made stationary by moving (with shift fork actuator) the shift fork towards a second position (opposite in direction as compared to in the first ratio at the first position). This happens as follows: the shift fork has spline teeth on its outer diameter (OD) as well as its inner diameter (ID). The teeth on the OD connect to mating spline teeth on the transmission housing. These teeth enable only sliding motion of the shift fork and do not allow the shift fork to rotate. Hence, when the shift fork moves towards the second position, this brings the ID teeth on shift fork in connection to second ring gear spline teeth on OD thereby, making the second ring gear stationary. This enables multiplied torque transfer thru the second planetary carrier to the layshaft pinion gear.

In the neutral and/or flat towing (towing on all 4 wheels), the shift fork is in a middle position wherein neither second ring gear and nor the second planetary carrier is connected to the input torque.

A schematic of a vehicle is shown with a transmission in FIG. 1. A schematic of components of the driveline is shown in FIG. 2A, with FIGS. 2B-C showing different power paths. FIG. 2A shows a cross-section of example components, such as a motor, first and second axle shafts, etc. FIG. 2B-2C show the power flow in a first and a second gear of the driveline, respectively.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

Figure 3:
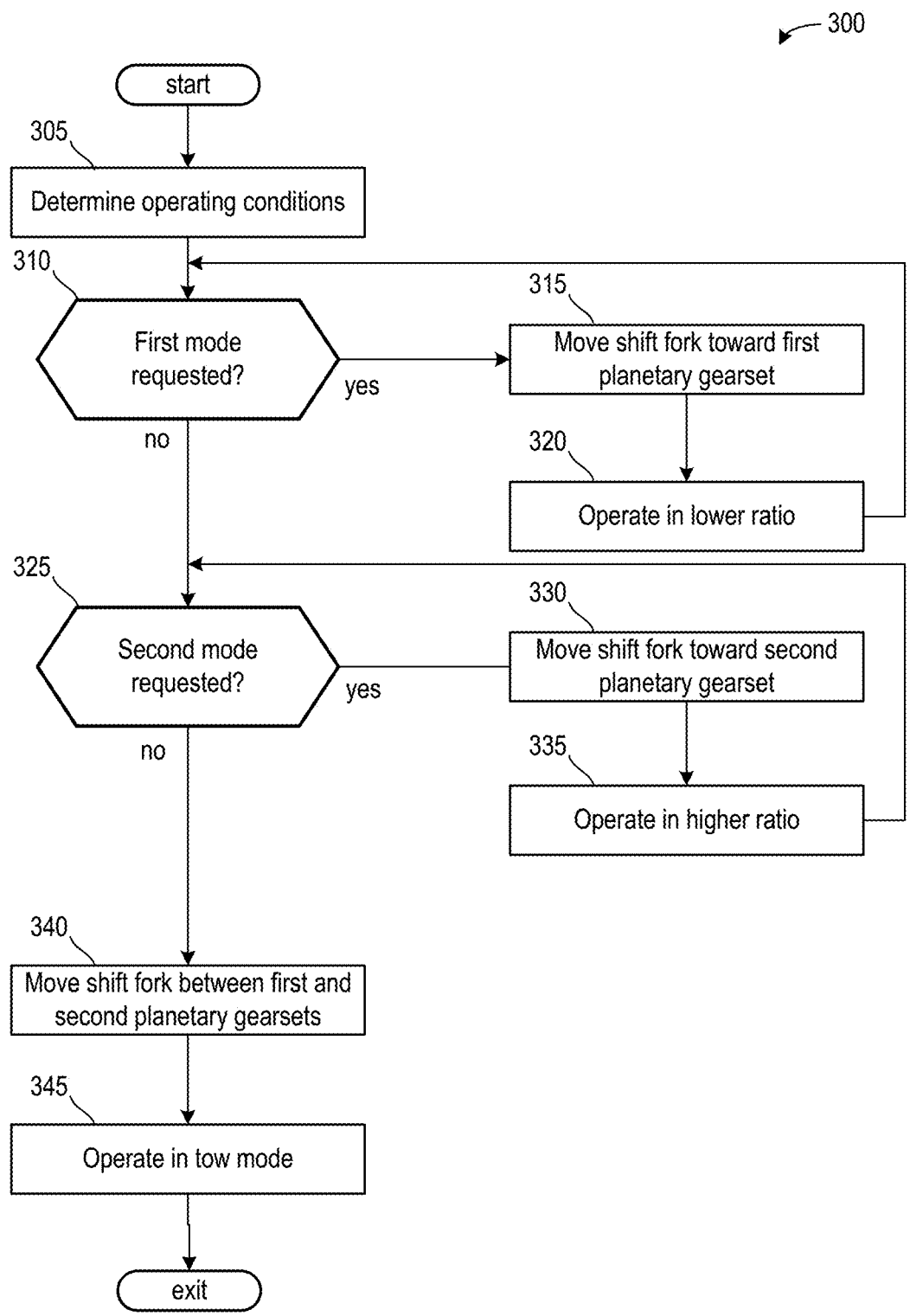
FIG. 3 shows a method of operating the transmission.
Figure 4A:
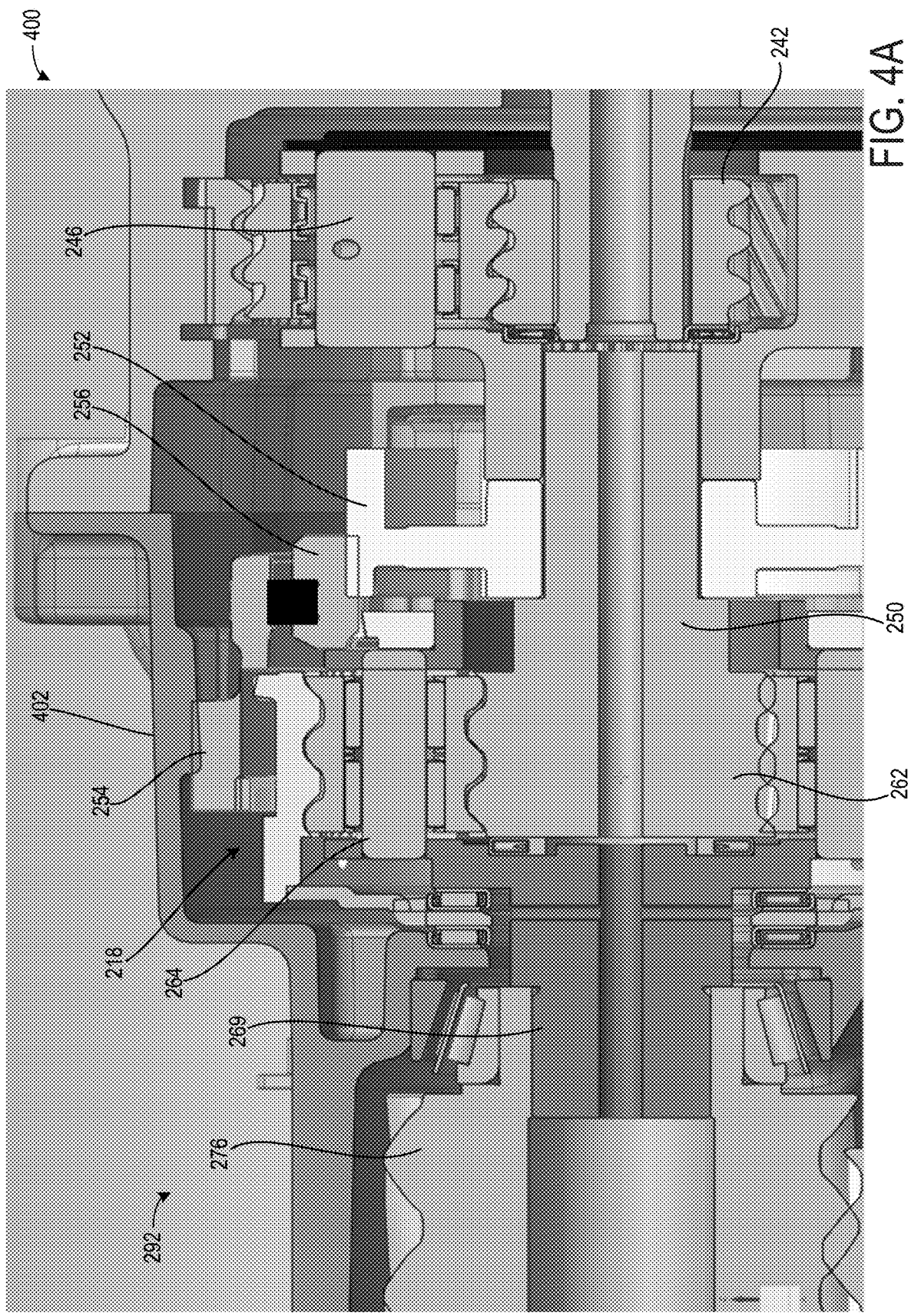
FIG. 4A shows the gearbox in a high range mode.
Figure 4B:
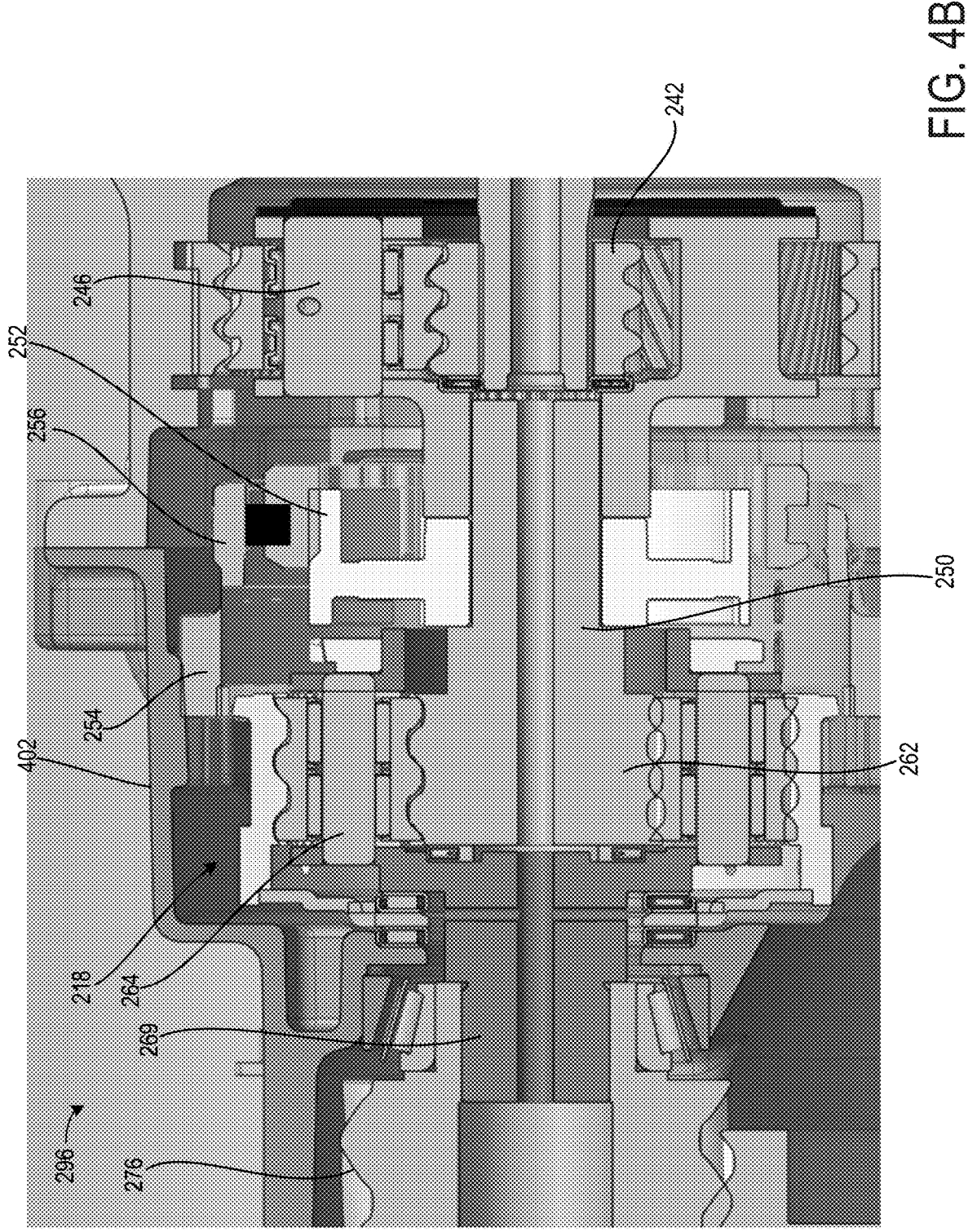
FIG. 4B shows the gearbox in a low range mode.
Figure 4C:
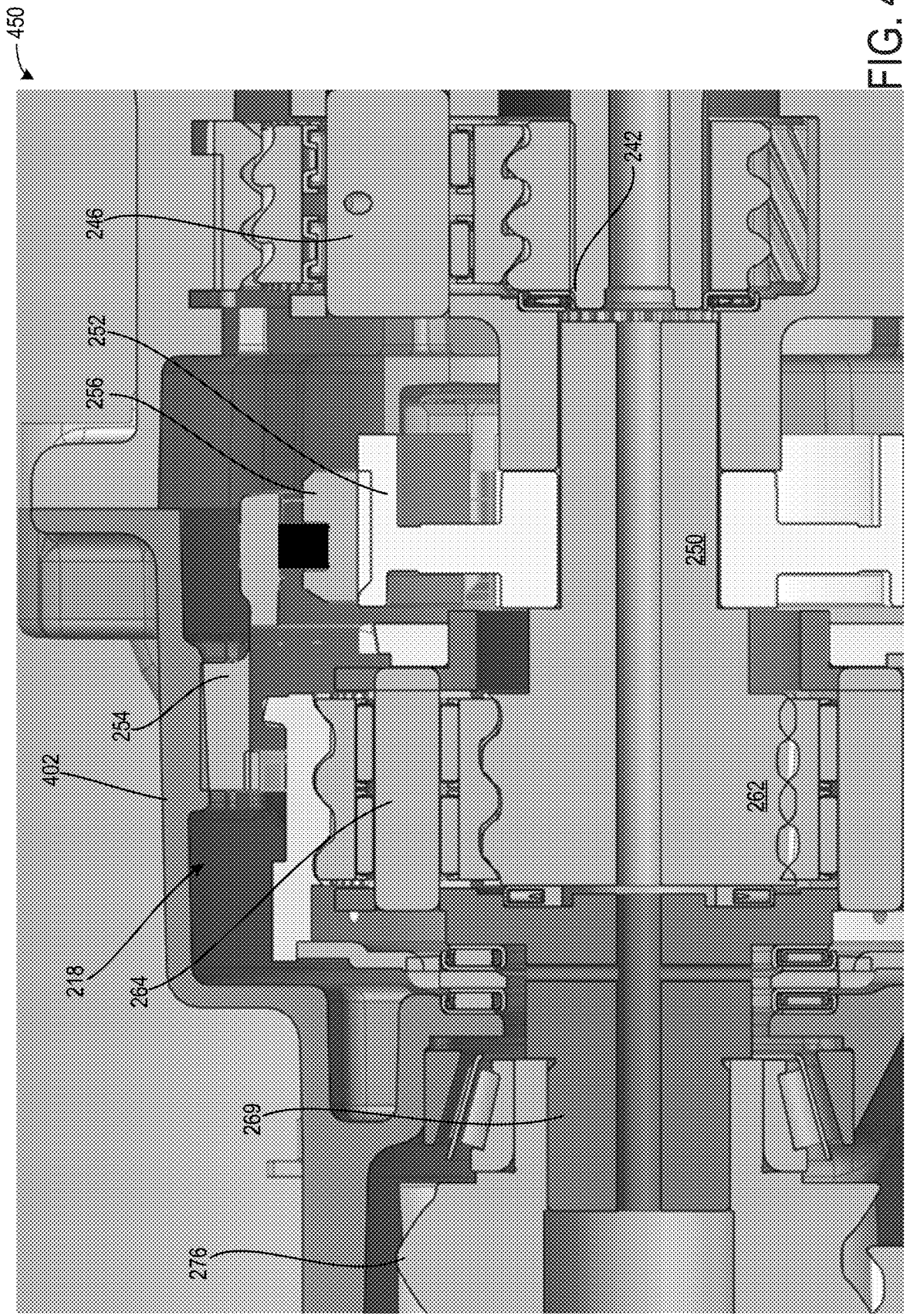
FIG. 4C shows the gearbox in a neutral mode.
Figure 5:
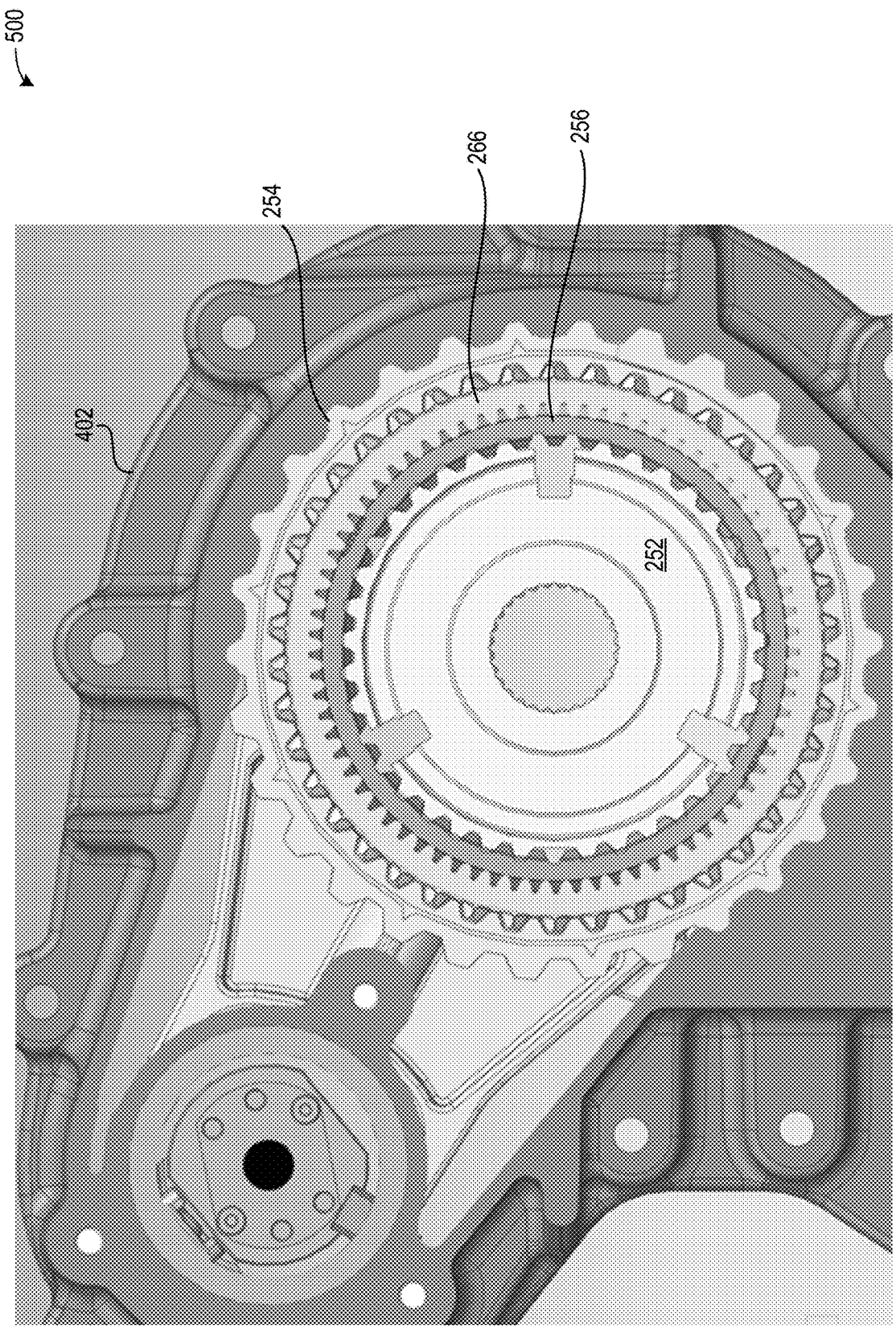
FIG. 5 shows teeth of a shift fork meshing with a housing in the low range mode.

FIG. 1 shows schematics of example configurations with relative positioning of the various components. FIGS. 2A-C show example configurations with approximate position. FIG. 3 shows a method for the gearbox. FIG. 4A shows the gearbox in a high range mode. FIG. 4B shows the gearbox in a low range mode. FIG. 4C shows the gearbox in a neutral mode. FIG. 5 shows teeth of a shift fork meshing with a housing in the low range mode. FIGS. 2A-C and 4A-5 are shown approximately to scale. However, it is to be appreciated that FIGS. 2A-C may be used to represent other relative dimensions. As used herein, the terms "approximately" is construed to mean plus or minus five percent of the range unless otherwise specified.

Further, FIGS. 1-2C and 4A-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings. FIGS. 2A-2C and 4A-5 are shown approximately to scale.

Turning to FIG. 1, an example vehicle 5 is shown. The vehicle 5 may have a front end 100 and a rear end 102, and may be bisected into two approximately symmetrical halves by a longitudinal axis 104.

In some examples, vehicle 5 may be a hybrid vehicle with multiple sources of torque available to one or more vehicle wheels 55. Alternatively, the vehicle 5 may include solely an internal combustion engine. In other examples, vehicle 5 may be an all-electric vehicle, powered exclusively by an energy storage device such as a battery.

In the example shown, vehicle 5 includes a prime mover 52. In other examples the prime mover 52 may be an electric machine which may be an electric motor, an electric motor/generator, or an electric motor/engine. The prime mover 52 may receive electrical power from the battery 58 which is converted to rotational energy, e.g., torque, at a transmission 56. In another example the prime mover 52 may be an engine, such as an internal combustion engine. For this example, the prime mover 52 may receive a fuel such as gasoline or diesel to combust, converting chemical energy from the fuel into rotational energy e.g., torque, at a transmission 56

The torque may be delivered to vehicle wheels 55, which may include set of front wheels proximate to a front end 100 of vehicle 5 and/or a set of rear wheels proximate to a rear end 102 of vehicle 5. Prime mover 52 may also be operated as a generator to provide electrical power to charge the battery 58, for example, during a braking operation.

FIG. 1 shows an embodiment prime mover 52 provides rotational energy to the wheels of vehicle 5 via the transmission 56. For this example, the embodiment of vehicle 5 has a prime mover 52 and the transmission 56 closest to the front end 100 of vehicle 5. A gearbox 70 is incorporated into the transmission providing the transmission with different gears to select via a clutch. For this example, the prime mover 52 and transmission 56 may provide rotational energy to a first differential 66 to rotate the wheels 55 closest to the front end 100. For another example the prime mover the prime mover 52 and transmission 56 may provide rotational energy to a first differential 66 to rotate the wheels 55 closest to the rear end 102. Furthermore, in other examples, each of the wheels 55 near the front end 100 and the wheels 55 near the rear end 102 may be coupled to individual transmissions, such as when vehicle 5 is configured with all-wheel drive. As well, in other embodiments, transmission 56 and/or prime mover 52 may be arranged closer to the rear end 102 of vehicle 5 rather than the front end 100.

The battery 58 may be between the vehicle wheels 55 and closer to the rear end 102 of vehicle 5 than the front end 100. For example, the battery 58 may be positioned below rear passenger seats of the vehicle. In another example, the battery 58 may be located in a floor of a rear compartment of the vehicle or may be integrated into a vehicle chassis. In other examples, however, the battery 58 may be located in a different relative position within vehicle 5 than shown in FIG. 1.

A set of reference axes 202 are provided for comparison between views shown in FIGS. 2A-2C. The reference axes 202 indicate a y-axis, an x-axis, and a z-axis. In one example, the z-axis may be parallel with a direction of gravity and the x-y plane may be parallel with a horizontal plane that a trans axle architecture 201 may rest upon. When referencing direction, positive may refer to in the direction of the arrow of the y-axis, x-axis, and z-axis and negative may refer to in the opposite direction of the arrow of the y-axis, x-axis, and z-axis. An arrow represented by a filled circle may represent an axis facing toward, or positive to, a view.

Turning to FIG. 2A, it shows a cross section 200 of the components of a trans axle architecture 201 that may be included in the gearbox 70 in the transmission 56 of FIG. 1. The trans axle architecture 201 may include an electric machine 204. Electric machine 204 may be the same as prime mover 52 of FIG. 1 or may be a different motor or machine in the case of a hybrid vehicle. Additionally, a differential 214 may be drivingly coupled to the trans axle architecture 201. For this example, the differential 214 may be identical to the first differential 66 of FIG. 1.

The trans axle architecture 201 may have a first side 224 and a second side 226 opposite the first side 224. The trans axle architecture 201 comprises a gear assembly 212 with a plurality of gearsets. The gear assembly 212 may be housed in a gearbox such as gearbox 70 of FIG. 1. The gear assembly 212 comprises a first planetary gearset 216, a second planetary gearset 218, and a layshaft gearpair 222. The trans axle architecture 201 may include a first center axis 206 and a second center axis 208 that may be parallel with one another and for this example the x-axis. For this example, the first center axis 206 may be located above the second center axis 208 with respect to the z-axis. Located along and circumferentially surrounding the first center axis 206 are the electric machine 204, the first planetary gearset 216, the second planetary gearset 218, and the shifting mechanism 220. Located along and circumferentially surrounding the second center axis 208 is the differential 214. The layshaft gearpair 222 may mechanically couple components surrounding the first center axis 206 to components surrounding the second center axis 208.

The electric machine 204 is located near the second side 226. A motor shaft 232 extends from the electric machine 204 toward the first side 224 along the first center axis 206 and may spline with the first planetary gearset 216. The motor shaft 232 may be supported and circumferentially surrounded by a motor shaft bearing 234, allowing the motor shaft 232 to spin relative to a housing of the electric machine 204 about the first center axis 206. The electric machine 204 and rotation of the motor shaft 232 may transfer torque and mechanical energy to the first planetary gearset 216 and other components of the trans axle architecture 201.

The motor shaft 232 may spline with the first planetary gearset 216 via a first sun gear 242. The first sun gear 242 circumferentially surrounds a portion of, may be coupled to, and may spin with the motor shaft 232. Circumferentially surrounding the first sun gear 242 is a first planetary carrier 244. The first planetary carrier 244 may carry gears with teeth that are meshed with the first sun gear 242 and a first ring gear 246. The first ring gear 246 may circumferentially surround the sun gear 242 and the first planetary carrier 244, with the first planetary carrier 244 arranged between the first ring gear 246 and the sun gear 242. The first ring gear 246 may be locked with the casting of the transmission, such as transmission 56, and as such, remain stationary. The first planetary carrier has an output 248 that may spline with a first output shaft 250, wherein, the first output shaft 250 may spline with the shifting mechanism 220 and the second planetary gearset 218.

The shifting mechanism 220 is located on the first side 224 of the first planetary gearset 216, and between the first and second planetary gearsets 216, 218. A first output shaft 250 may spline with the shifting mechanism 220 via a shift ring 252. The shifting mechanism 220 comprises a shift actuator 251, a shift fork 254, a sliding collar 256, and the shift ring 252. The shift fork 254, the sliding collar 256, and the shift ring 252 may circumferentially surround the first output shaft 250.

The first output shaft 250 may extend and spline with the second planetary gearset 218, via a second sun gear 262. The second sun gear 262 circumferentially surrounds a portion of and may spin with the first output shaft 250. Circumferentially surrounding the second sun gear 262 is a second planetary carrier 264. The second planetary carrier 264 may carry planet gears with teeth that are meshed with the second sun gear 262 and a second ring gear 266. The second ring gear 266 may circumferentially surround the sun gear 262 and the second planetary carrier 264. The second planetary carrier 264 has a second output shaft 268 that may spline with a layshaft pinion gear 276. In one example, the second output shaft 268 is an extension of the second planetary carrier 264. Said another way, the second output shaft 268 and the second planetary carrier 264 may be a single piece. The second output shaft 268 may be supported by a bushing 269.

The shift fork 254 may be moved by the shift actuator 251 to the first side 224 or the second side 226. The sliding collar 256 may be coupled to the shift fork 254. The sliding collar 256 may include dog teeth that mate with dog teeth on the shift ring 252 to form a dog clutch. Movement of the shift fork 254 toward the second side 226 may lock the sliding collar 256 with the shift ring 252, therein placing the shifting mechanism 220 in a first speed ratio (e.g., the high range or high range mode). In the high range, the second sun gear 262, the second planetary carrier 264, and the second ring gear 266 may rotate with the same speed as the first output shaft 250.

When the shift fork 254 is shifted to the first side 224, the dog teeth on the inner diameter of the shift fork 254 may mate with dog teeth on the second ring gear 266. Dog teeth on the outer diameter of the shift fork 254 may mate with dog teeth on the transmission housing. The mating of the dog teeth of the shift fork 254 with the dog teeth of the second ring gear 266 and transmission housing prevent the second ring gear 266 from rotating, placing the shifting mechanism 220 in a second speed ratio (e.g., the low range or low range mode). The second speed ratio is different than the first speed ratio. In one example, the second speed ratio is lower than the first speed ratio.

A layshaft pinion gear 276 is the first gear in the layshaft gearpair 222. Herein, the layshaft pinion gear 276 is referred to as a first layshaft pinion gear 276. The first layshaft pinion gear 276 may act as a pinion. Portions of the first layshaft pinion gear 276 may be supported and have portions circumferentially surrounded by a second bearing 272 and a third bearing 274. The first layshaft pinion gear 276, second bearing 272, and third bearing 274 may circumferentially surround the second output shaft 268. The second and third bearings 272, 274 allow the first layshaft pinion gear 276 to rotate smoothly about the second output shaft 268. The first layshaft pinion gear 276 may have teeth meshed with a second layshaft gear 278. The first layshaft pinion gear 276 may transfer mechanical energy via torque and force the second layshaft gear 278 to rotate. The second layshaft gear 278 may circumferentially surround and rotate about the second center axis 208 and the differential 214.

The rotation of the second layshaft gear 278 may transfer mechanical energy via torque to the gears of a differential gear assembly 284 within a housing 282 of the differential 214. The transfer of torque may force the gears of the differential gear assembly 284 to rotate, and may force the first axle shaft 286a that extends toward the first side 224 and the second axle shaft 286b that extends toward the second side 226 to rotate. The differential gear assembly 284 may distribute the same or approximately similar torque to the first axle shaft 286a or the second axle shaft 286b. The differential gear assembly 284 may distribute different torque values to the first axle shaft 286a or the second axle shaft 286b. The first axle shaft 286a may deliver torque and force a first wheel to rotate. The second axle shaft 286b may deliver torque to and force a second wheel coupled to the second axle shaft 286b to rotate.

Turning to FIG. 2B, it shows a power transfer of the high range mode 292 of the trans axle architecture 201. The trans axle architecture 201 is shown with a first power flow 294 represented by bold arrows. A positional change of the components in the high range mode 292 is shown in FIG. 4A.

Turning to FIG. 2C, it shows a cross-section of the low range mode 296 of the trans axle architecture 201. The trans axle architecture 201 is shown with a second power flow 298 represented by arrows. A positional change of the components in the low range mode 296 is shown in FIG. 4B.

During the high range mode 292 and low range mode 296, the first and second power flows 294, 298 may travel through from the motor shaft 232 to the first planetary gearset 216. In the first planetary gearset 216, the torque of the first power flow 294 and second power flow 298 may force the first sun gear 242 and first planetary carrier 244 to rotate about the first center axis 206. The first and second power flows 294, 298 may leave through the output 248 of the first planetary carrier 244 and force the first output shaft 250 to rotate.

The first and second power flows 294, 298 may also travel from the second output 268 into the layshaft gearpair 222 and into the differential 214 to deliver torque to the first and second axle shafts 286a, 286b. The first and second power flows 294, 298 may transfer torque to the layshaft pinion gear 276 through the second output 268, the layshaft pinion gear 276 to the second layshaft gear 278, the second layshaft gear 278 to the differential gear assembly 284, and the differential gear assembly to the first and second axle shafts 286a, 286b.

When in the high range mode 292, the first power flow 294 may transfer torque and mechanical energy from the first output shaft 250 to second sun gear 262, second planetary carrier 264, and second ring gear 266 via the sliding collar 256 and shift ring 252. Therein the second sun gear 262, second planetary carrier 264, and second ring gear 266 may rotate with the same RPM speed as the first output shaft 250 and second output 268.

As shown in FIG. 4A, when in the high range mode 292, the sliding collar 256 splines on to teeth of the second planetary carrier 264. This enables the first and second planetary carrier to rotate at equivalent speeds. The shift fork 254 and the sliding collar 256 are actuated to a first position, that is furthest from the first planetary carrier 246 and the first sun gear 242.

When in the low range mode 296, the second power flow 298 may transfer torque and mechanical energy from the first output shaft 250 to the second sun gear 262, from the second sun gear 262 to the second planetary carrier 264, and from the second planetary carrier 264 to the second output 268. The second planetary carrier 264 may increase the torque of the second power flow 298 compared to the first power flow 294 by slowing RPM of the second planetary carrier 264 and second output 268.

As shown in FIG. 4B, when in the low range mode 296, the shift fork 254 and the sliding collar 256 move to a second position, nearest to the first planetary carrier 246 and the first sun gear 242. Teeth of the shift fork 254 may be interlocked with teeth of the second ring gear 266. As such, the second ring gear 266 may be grounded and unable to rotate. This may enable a gear ratio multiplication such that the second planetary carrier 264 rotates at a different speed than the first planetary carrier 246. The sliding collar 256

A detailed view of various teeth of the components engaging one another is shown in FIG. 5. Therein, outer teeth of the shift fork 254 are shown interlocked with teeth of a housing 402 of the gearbox. Inner teeth of the shift fork 254 interlock with outer teeth of the second ring gear 266.

Turning to FIG. 4C, it shows a third position 400, which is between the first position of the high range mode 292 and the second position of the low range mode 296. In one example, the third position 400 is a tow position in which power is not transferred through the gearbox.

Turning now to FIG. 3, it shows a method 300 for operating the shifting mechanism of the transmission. Instructions for carrying out method 300 may be executed by a controller based on instructions stored on a memory of the controller and in conjunction with signals received from sensors of the engine system, such as the sensors described above with reference to FIG. 1. The controller may employ actuators of the system to adjust operation, according to the method described below.

The method 300 begins at 305, which includes determining operating conditions. Operating conditions may include a vehicle speed, a vehicle location, an electric machine temperature, and the like.

At 310, the method 300 may include determining if a first mode is requested. The first mode may be manually requested by a vehicle operator. The vehicle operator may press a button, actuate a shifter, or the like. Additionally or alternatively, the first mode may be automatically requested based on traction sensed at one or more wheels of the vehicle. For example, if traction at each wheel is above a threshold traction, then lower ratio may be used for a current driving condition and the first mode may be requested without the vehicle operator providing an input beyond depressing pedals and actuating a steering device. In some embodiments, additionally or alternatively, if the vehicle is an autonomous vehicle or includes an autonomous driving mode, the vehicle may automatically request the first mode. The first mode may be automatically requested based on the traction sensed at each wheel as described above, and/or may be automatically requested based on a location in which the vehicle is located. For example, if the vehicle is driving on pavement, concrete, dirt, or another surface that is relatively smooth and uniform, then the first mode may be requested.

If the first mode is requested, then at 315, the method 300 may include moving the shift fork toward the first planetary gearset. The second planetary gearset is locked when the shift fork is actuated toward the first planetary gearset and away from the second planetary gearset. As such, the second planetary gearset may operate as a flywheel, wherein the sun gear, planet gears, and ring gear of the second planetary gearset rotate in unison. An actuator of the shift fork may be energized (e.g., supplied electrical power) and shift the shift fork toward the first planetary gearset. A sliding collar may move the with the shift fork, wherein the sliding collar comprises teeth that may mesh with teeth of a shift ring splined with a planetary carrier shaft. As such, the sun gear and the planetary carrier of the first planetary gearset may rotate at equal speeds, which rotates the ring gear of the first planetary gearset at the same speed.

At 320, the method 300 may include operating in a lower gear ratio. In one example, the lower gear ratio is identical to the first gear ratio described above. The lower gear ratio may be a high range ratio used for city and/or highway driving, wherein surfaces are smoother and more uniform compared to off-road surfaces.

Returning to 310, if the first mode is not requested, then at 325, the method 300 may include determining if the second mode is requested. The second mode may be manually requested by the vehicle operator. Additionally or alternatively, the second mode may be requested if a traction sensed at one or more wheels of the vehicle is less than the threshold traction. Additionally or alternatively, if a surface on which the vehicle is driving is uneven, rocky, or non-uniform, then the second mode may be requested and a higher ratio may be desired. In one example, the second mode is an off-road mode.

If the second mode is requested, then at 330, the method 300 may include moving the shift fork toward the second planetary gearset. The shift fork may include outer diameter and inner diameter teeth. The outer diameter teeth may mesh with teeth of a transmission housing. The inner diameter teeth may mesh with the ring gear of the second planetary gearset. The shift fork may only slide, and may not rotate, when it is meshed with the transmission housing. As such, the ring gear becomes stationary. Torque transfer from the second planetary gearset to the layshaft gear pairs may be multiplied and provide a higher torque than the first mode.

At 335, the method 300 may include operating in the higher ratio. The higher ratio may be identical to the second ratio described above. The higher ratio may be a low range gear state used for off-roading conditions. Additionally or alternatively, the higher ratio may be used when a greater amount of torque is desired.

Returning to 325, if the second mode is not requested, then at 340, the method 300 may include moving the shift fork between the first and second planetary gearsets. In this position (e.g., a third position), the shift fork and/or other components of the shifting mechanism may not mesh with either of the first planetary gearset and the second planetary gearset. In one example, the shift fork is spaced away from each of the first and second planetary gearsets in the third position.

At 345, the method 300 may include operating in a tow mode. The transmission may be operated in neutral, which may include where neither of the first and second planetary gearsets is connected to input torque provided to the transmission and/or wheels.

The disclosure provides support for a system including a shifting mechanism arranged between a first planetary gearset and a second planetary gearset arranged in series, wherein the shifting mechanism is configured to adjust an operating mode to a first mode, a second mode, or a tow mode. A first example of the system further includes where the first planetary gearset and the second planetary gearset comprise a sun gear, a planet carrier, and a ring gear. A second example of the system, optionally including the first example, further includes where the second planetary gearset is locked during the first mode and components thereof spin in unison. A third example of the system, optionally including one or more of the previous examples, further includes where the shifting mechanism comprises a shift actuator, a shift fork, a sliding collar, and dog rings, and wherein the sliding collar comprises teeth that mesh with teeth on a shift ring on a planet carrier of the first planetary gearset. A fourth example of the system, optionally including one or more of the previous examples, further includes where the shifting mechanism moves toward the first planetary gearset and away from the second planetary gearset in the first mode. A fifth example of the system, optionally including one or more of the previous examples, further includes where the shifting mechanism locks only a ring gear of the second planetary gearset during the second mode and a planet carrier of the second planetary gearset transfers power to a gear of a gear pair. A sixth example of the system, optionally including one or more of the previous examples, further includes where the shifting mechanism is spaced away from each of the first planetary gearset and the second planetary gearset during the tow mode.

The disclosure provides additional support for an assembly for a trans axle including a first planetary gearset configured to receive a power output from an electric machine, a second planetary gearset configured to transfer power from the first planetary gearset to a first layshaft gear, a second layshaft gear configured to transfer power from the first layshaft gear to wheels, and a shifting mechanism arranged between the first planetary gearset and the second planetary gearset, the shifting mechanism configured to couple to the first planetary gearset during a first mode, couple to the second planetary gearset during a second mode, and be spaced away from the first planetary gearset and the second planetary gearset. A first example of the assembly further includes where the shifting mechanism comprises a sliding collar comprising teeth that interlock with teeth of a planetary carrier of the first planetary gearset during the first mode. A second example of the assembly, optionally including a first example, further includes where the shifting mechanism comprises a shift fork with teeth on its outer diameter that interlock with a transmission housing, and wherein the shift fork further comprises teeth on its inner diameter that interlock with a ring gear of the second planetary gearset and block rotation thereof during the second mode. A third example of the assembly, optionally including one or more of the previous examples, further includes where the first mode comprises a first gear ratio and the second mode comprises a second gear ratio, the first gear ratio lower than the second gear ratio. A fourth example of the assembly, optionally including one or more of the previous examples, further includes where the second planetary gearset rotates as a single mass during the first mode. A fifth example of the assembly, optionally including one or more of the previous examples, further includes where the second planetary gearset comprises stationary and rotating components during the second mode. A sixth example of the assembly, optionally including one or more of the previous examples, further includes where the second layshaft gear is coupled to a differential. A seventh example of the assembly, optionally including one or more of the previous examples, further includes where the shifting mechanism is electrically controlled.

The disclosure provides further support for a method for a transmission including moving a shift fork toward a first planetary gearset during a first mode, moving the shift fork toward a second planetary gearset during a second mode, different than the first mode, and moving the shift fork to a position spaced away from the first planetary gearset and the second planetary gearset during a tow mode. A first example of the method further includes where the shift fork is in meshed engagement with each of a transmission housing and a ring gear of the second planetary gearset during the second mode. A second example of the method, optionally including the first example, further includes where the first planetary gearset and the second planetary gearset each include a sun gear positioned to rotate about a common axis. A third example of the method, optionally including one or more of the previous examples, further includes where actuating a sliding collar with the shift fork. A fourth example of the method, optionally including one or more of the previous examples, further includes where engaging teeth of the shift fork with teeth of a transmission housing of the transmission and teeth of a ring gear of the second planetary gearset during the second mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a shifting mechanism arranged between a first planetary gearset and a second planetary gearset arranged in series, wherein the shifting mechanism is configured to adjust an operating mode to a first mode, a second mode, or a tow mode, wherein the shifting mechanism comprises a shift fork with teeth on its outer diameter that interlock with a transmission housing, and wherein the shift fork further comprises teeth on its inner diameter that interlock with a ring gear of the second planetary gearset and block rotation thereof during the second mode.

2. The system of claim 1, wherein the first planetary gearset comprises a sun gear, a planet carrier, and a ring gear, and the second planetary gearset comprise a sun gear, a planet carrier, and a ring gear.

3. The system of claim 1, wherein the second planetary gearset is locked during the first mode and components thereof spin in unison.

4. The system of claim 3, wherein the shifting mechanism further comprises a shift actuator and a sliding collar, and wherein the sliding collar comprises teeth that mesh with teeth on a shift ring on a carrier shaft of the first planetary gearset.

5. The system of claim 3, wherein the shifting mechanism moves toward the first planetary gearset and away from the second planetary gearset in the first mode.

6. The system of claim 1, wherein the shift fork locks only to the ring gear of the second planetary gearset during the second mode and a planet carrier of the second planetary gearset transfers power to a gear of a gear pair.

7. The system of claim 1, wherein the shifting mechanism is spaced away from each of the first planetary gearset and the second planetary gearset during the tow mode.

8. An assembly for a trans axle, comprising:
a first planetary gearset configured to receive a power output from an electric machine;
a second planetary gearset configured to transfer power from the first planetary gearset to a first layshaft gear;
a second layshaft gear configured to transfer power from the first layshaft gear to wheels; and
a shifting mechanism arranged between the first planetary gearset and the second planetary gearset, the shifting mechanism configured to couple to the first planetary gearset during a first mode, couple to the second planetary gearset during a second mode, and be spaced away from the first planetary gearset and the second planetary gearset, wherein the shifting mechanism comprises a shift fork with teeth on its outer diameter that interlock with a transmission housing, and wherein the shift fork further comprises teeth on its inner diameter that interlock with a ring gear of the second planetary gearset and block rotation thereof during the second mode.

9. The assembly of claim 8, wherein the shifting mechanism comprises a sliding collar comprising teeth that interlock with teeth of a carrier shaft of the first planetary gearset during the first mode.

10. The assembly of claim 8, wherein the first mode comprises a first gear ratio and the second mode comprises a second gear ratio, the first gear ratio lower than the second gear ratio.

11. The assembly of claim 8, wherein the second planetary gearset rotates as a single mass during the first mode.

12. The assembly of claim 11, wherein the second planetary gearset comprises stationary and rotating components during the second mode.

13. The assembly of claim 8, wherein the second layshaft gear is coupled to a differential.

14. The assembly of claim 8, wherein the shifting mechanism is electrically controlled.

15. A method for a transmission, comprising:
moving a shift fork toward a first planetary gearset during a first mode;
moving the shift fork toward a second planetary gearset and engaging teeth of the shift fork with teeth of a transmission housing of the transmission and teeth of a ring gear of the second planetary gearset during a second mode, different than the first mode; and
moving the shift fork to a position spaced away from the first planetary gearset and the second planetary gearset during a tow mode.

16. The method of claim 15, wherein the shift fork is in meshed engagement with each of the transmission housing and the ring gear of the second planetary gearset during the second mode.

17. The method of claim 15, wherein the first planetary gearset and the second planetary gearset each include a sun gear positioned to rotate about a common axis.

18. The method of claim 15, further comprising actuating a sliding collar with the shift fork.

* * * * *